United States Patent [19]

McClain

[11] Patent Number: 4,488,308
[45] Date of Patent: Dec. 11, 1984

[54] ELECTRONIC BISTABLE THREE-DIMENSIONAL ARRAY

[76] Inventor: W. Martin McClain, 628 Canfield, Detroit, Mich. 48201

[21] Appl. No.: 412,136

[22] Filed: Aug. 27, 1982

[51] Int. Cl.³ .................................................. H01S 3/22
[52] U.S. Cl. ........................................ 372/57; 372/3; 350/393; 350/354
[58] Field of Search ...................... 372/3, 57; 350/393, 350/354

[56] References Cited
PUBLICATIONS

Tarng et al., "External off and on Switching of a Bistable Optical Device"; Appl. Phys. Lett. 40 (3), Feb. 1, 1982.

Primary Examiner—William L. Sikes
Assistant Examiner—Léon Scott, Jr.
Attorney, Agent, or Firm—David A. Maxon

[57] ABSTRACT

A crystalline array wherein selected segments thereof can be selectively energized from a primary state to a secondary state; selectively de-energized from the secondary state back to the primary state; and selectively probed to determine whether the sector selected is in the primary or secondary state. The device is capable of being utilized as a switching device.

2 Claims, 6 Drawing Figures $$2\underline{K}_1 = \underline{K}_2 + \underline{K}_3$$

ELECTRONIC BISTABLE THREE-DIMENSIONAL ARRAY

This invention relates generally to switching devices. More particularly, this invention relates to bistable switches.

In the prior art, numerous devices have been utilized as switches. Some switching devices are purely mechanical. One of the problems with mechanical switches is that they are slow in operation, are expensive where a large array of them are utilized, and are subject to mechanical breakdown.

Accordingly, it is an object of this invention to provide a switching device substantially free of parts subject to mechanical breakdown and mechanical friction, that is inexpensive to build, utilize and maintain.

In the prior art, a number of switches have been developed which are electromechanical. Such devices, although often faster in operation than purely mechanical devices, are also subject to mechanical breakdown and are also expensive to utilize in a large array.

Accordingly, it is an object of this invention to provide a switching device that is substantially free of electromechanical actuation in large array and that is capable of being built, maintained and used economically.

Another switching device that has been developed in the past has been several types of electronic switching devices. One such type uses nonlinear circuit components such as transistors, diodes and/or tubes. One of the problems of these devices has been the necessity for maintaining the switching array in an excited condition for maintainance of any desired switching position. Another problem with this type of device has been the expense of providing a large array of such devices in a cooperating manner. Still another problem is reliability of such devices in that the breakdown of the switching component in a large array can give rise to unreliable performance of the array as a whole.

Accordingly, it is another object of this invention to provide a switching device utilizable in a large array of switching positions substantially free of separate nonintegral electronic components that is inexpensive and uncomplicated to build, maintain and use.

Another development of switching devices is the utilization of magnetization of either a large array of magnetically excitable components or magnetization of a particular portion of a surface of a magnetically excitable surface. One of the problems of such devices, particularly in the case of a large array of a large number of separate nonintegral magnetizable components, is the unreliability and cost of utilizing a switching device that has many components, any one of which in failure can cause a failure of the switching device as a whole. Another problem with such devices, particularly where a portion of magnetizable surface is utilized as a switching component, is the limited number of switching components because of the limitation to essentially a surface or planar array.

Accordingly, it is an object of this invention to provide a switching device that is free of a large number of individual nonintegral components and that is capable dimensionally of being constructed of an array of switching portions that are not confined merely to a surface or planar configuration.

In the prior art, efforts have been made to utilize crystals or crystalline structures for selectively determinable excited conditions. One of the problems of such past efforts is that it has been difficult to provide excitation of a mere portion of a crystal as opposed to an entire crystal structure. Another problem has been the problem of localizing a particular selective region of the crystal for particular discrete excitation states.

Accordingly, it is an object of this invention to provide a switching device in which an array is provided within a crystalline structure wherein a selected region within the crystalline structure may be selectively utilized for a selected particular array of bistable conditions.

Still another problem in the utilization of excited states within a crystalline structure has been the problem of providing a discrete excitation within a particular region of the crystal. One technique has been the utilization of electromagnetic wave directing apparatus to excite a region of the crystal from one state to another. One of the difficulties of using a particular electromagnetic wave for this excitation has been the reliance in the past upon a single excitation parameter.

Accordingly, it is an object of this invention to provide excitation requiring at least two different parameters for determination of discrete bistable states within a crystalline structure.

Still another problem in the excitation of crystals in a switching device is the problem of determining which state a region of the crystal is excited to without disturbing the excitation state in such determination.

Accordingly, it is an object of this invention to utilize crystalline structure in a switching device wherein a selected region within said crystal can be selectively determined as to its excitation state by using electromagnetic wave techniques without disturbing the excitation state prior to such determination.

In Turing machines, it has been common practice to utilize electromechanical or electronic devices for a relatively small array of switches in directing weaving apparatus and similar and analogous processes and apparata. One of the problems with such Turing machines is the inability to be responsive to laser excitation.

Accordingly, it is an object of this invention to provide a Turing machine with laser excitation to perform basic functions of determining and ascertaining switch configuration in weaving and associated applications.

In Babbage engines, there has been no application of two photon spectroscopy.

Accordingly, it is an object of this invention to drive a Babbage machine with two photon spectroscopy.

These and other objects of this invention are more fully discussed in the specifications and claims below.

These and other objects of this invention are achieved by utilization of two laser beams. The intersection of the beams excites a crystal doped with at least two different n-mers. The intersection of the beams simultaneously excite one type of n-mer into a secondary excited state and changes the excitation state of the other type of n-mer into a state different from the secondary state of the first excited n-mer. Choosing a different set of frequency perameters for the laser beams causes the reverse to happen. Determination of the excitation of one type of n-mer within a selected region is done by utilizing coherent anti-Stokes Raman scattering. The region selected for secondary excitation, reversal of secondary excitation process, and coherent anti-Stokes Raman scattering may be within a pre-selected region within the interior of the crystalline structure. An array of regions that have been selectively excited in one state or the other constitutes a switching array.

Determination of the switch condition, corresponding to the excitation of the n-mers and, in particular, types of n-mers within the selected region, constitutes a determinable system of switching condition. The device utilizes two photon excitation of dimers or n-mers.

In the past, single photon excitation of structures embodying dimers has been attempted. Also in the past, two photon excitation of monimers has been attempted. In this invention, two photon excitation of dimers is utilized in achieving a determinable bi-stable electronic switching array.

ON THE DRAWINGS

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein are for the purpose of description and not of limitation.

AS SHOWN ON THE DRAWINGS

Figure 1:
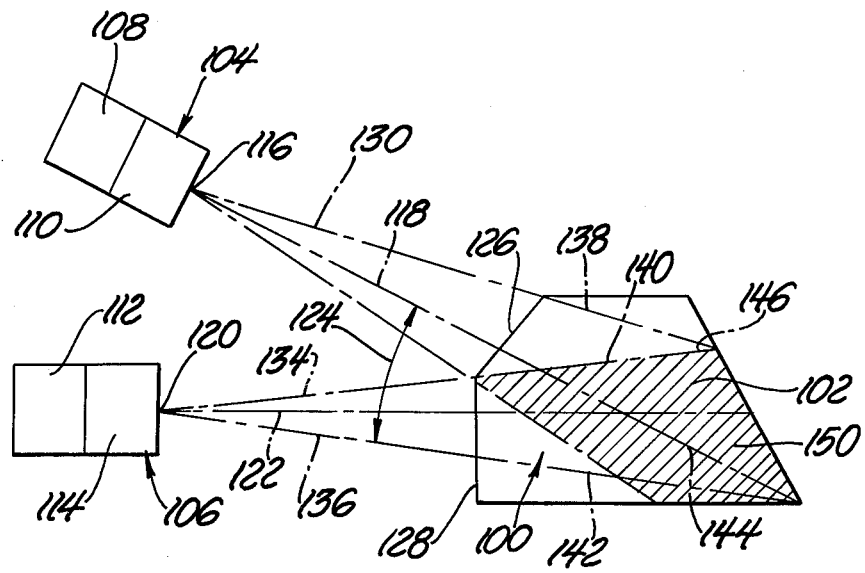
FIG. 1 is a partially transverse sectional view showing a portion of the preferred embodiment of this invention.

FIG. 1 shows a preferred embodiment of this invention at numeral 100. The structure 100 comprises a crystalline or other solid member 102 and a pair of laser generating and directing apparata 104,106. Laser apparatus 104 comprises a laser generating mechanism 108 and a laser directing apparatus portion 110. An example of a laser generating apparatus 108 is a continuous dye laser such as that manufactured by Spectra Physics Company of San Jose, Calif. or Coherent Laser Division of Palo Alto, Calif. An examplar laser directing apparatus 110 is the laser directing apparatus made by Klinger Scientific Corporation of Richmond Hill, N.Y.

Apparatus 106 comprises a laser generating apparatus 112 and laser directing apparatus 114 which are similar to apparatus 108 and 110 respectively. A laser beam emanating from a central focus region 116 in laser directing apparatus 110 may traverse a path indicated by numeral 118. In a similar fashion, a laser beam emanating from a central focusing portion 120 of apparatus 114 traverses a path 122.

The angle 124 between paths 118 and 122 is an acute angle substantially more than 0 degrees and substantially less than 90 degrees and is determined by a formula by the coherent anti-Stokes Raman process in a manner well known in the art. The variation of the angle 124 is also within tolerances within the art of coherent anti-Stokes Raman scattering. Depending on the excitation characteristics of the solid 102, a typical value for the angle 124 may be 30 degrees plus or minus 15 degrees.

The beam 118 intersects solid surface 126 in such a manner that the beam 118 is substantially perpendicular to surface 126. The beam 122 intersects surface 128 on solid 102 in such a manner that the path 122 is substantially perpendicular to surface 128. Path 130 describes a path that a laser beam may take from aperture 116 of apparatus 104 in such a manner that it intersects surface 126 near the extreme upper limit of that surface. Path 132 describes a path of a laser beam emanating from the central focusing region 116 of apparatus 104 in such a manner that the path 132 intersects surface 126 at the extreme lower limit of the surface 126.

Path 134 describes a path of the laser beam emanating from the central focusing or beam directing portion of apparatus 106 in such a manner that path 104 intersects surface 128 at the extreme upper limit of surface 128. Path 136 describes a path of a laser emanating from apparatus 106 in such a manner that path 136 intersects surface 128 at the extreme lower limit of surface 128.

When a laser emanates from apparatus 104 along path 130, it describes the upper boundary 138 of a region within solid 102 designated at numeral 140. When a laser beam is directed along path 136 generated by apparatus 106, it describes a lower boundary 142 within solid 102.

When a laser emanates from apparatus 104 along path 132, it describes a boundary 144 of a region within solid 102. When a beam emanates along path 134 from apparatus 106, it describes a boundary 146 within solid 102.

From the immediately foregoing description, it can be appreciated that beams emanating simultaneously from apparatus 104 and 106 can intersect anywhere in the region 150 bounded by boundaries 144 and 146.

Figure 2:
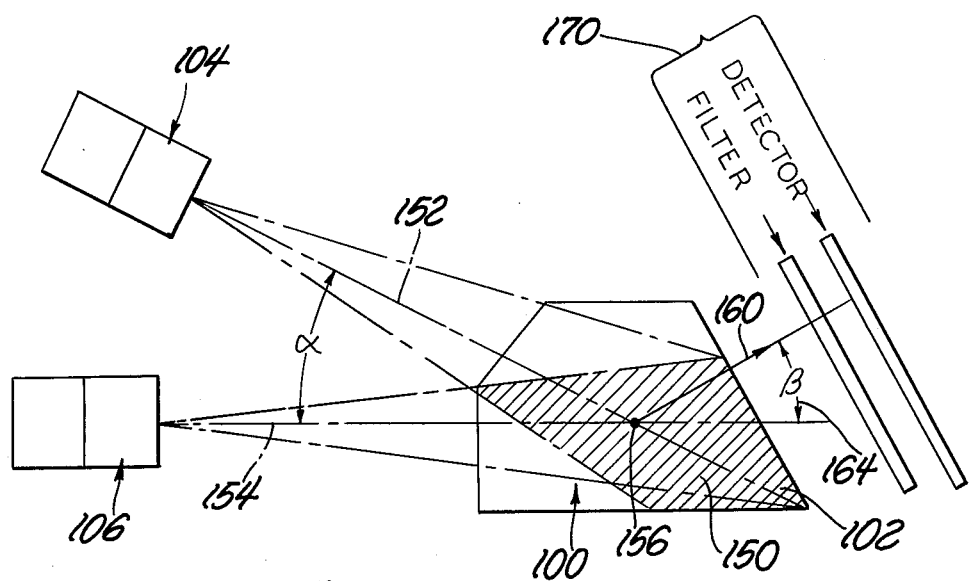
FIG. 2 is a partially transverse sectional view showing the preferred embodiment of this invention.

Referring to FIG. 2, again showing the apparatus 100 and laser generating and directing apparata 104, 106 and showing the intersecting region 150, it can be appreciated that a laser beam directed along the path 152 generated and directed by apparatus 106 will intersect within region 150 at a location 156 therein. The intersection of these beams within the solid 102 causes excitation of a beam along path 160 at an angle 164. The generation of this beam along path 160 is done in a manner well known in the art of coherent anti-Stokes Raman scattering. The beam along path 160 may be separated from other excitation by means of a filter and detector apparatus 170 in a manner well known in the art. An example of such an apparatus 170 is an SGD-100 photo diode made by Edgerton, Greer and Germhausen of Patterson, N.J. The detector portion of apparatus 170 may be that made by Hamamatser Corporation of Middlesex, N.J.

Figure 3:
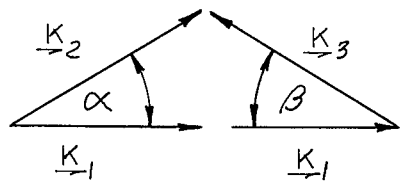
FIG. 3 is a diagram and formula illustrating a portion of the operation of the apparatus shown in FIG. 2.

The angles 124, 164 can be conveniently referred to as alpha and beta respectively, and their calculation can be determined in a manner well known in the art of coherent anti-Stokes Raman scattering. An examplar of such formula and diagram shown in FIG. 3 where the formula is 2 vector K1=vector K2 plus vector K3 where vector K1 is the propagation vector of beam 154; vector K2 is the propagation vector of beam 152; and vector K3 is the propagation vector of beam 160. Alpha is the angle between vectors K1 and K2 and beta is the angle between vectors K1 and K3.

Figure 4:
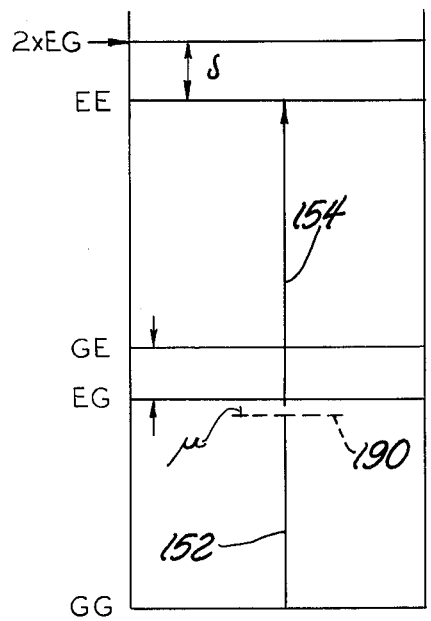
FIG. 4 is a diagram illustrating a portion of the operation of the apparatus shown in FIG. 2.

The material of solid 102 is doped with two dimers. FIG. 4 is a representational diagram of the excitation states of one of these dimers. The zero energy level is represented by GG. The full excitations of both the left and right hand members are represented by EE. Level EG represents the median excitation of one of these right or left hand members, and the level GE is the median excitation level of the other of the left or right hand members of the dimer.

A beam such as beam 152 generated from laser generating and directing apparatus 104 has a characteristic frequency such that the rise in the energy level in the dimer depicted in FIG. 4 is a little bit short of energy level EG. The level represented in FIG. 4 from the beam 152 does not correspond to any real excitation level of the material but is representational of an excitation level of the photons within the beam.

When there is simultaneous excitation from a beam such as beam 154 emanating from laser generating and directing apparatus 106, the combination of the simultaneous excitation from the two beams 152, 154 results in full excitation levels to the level EE of the dimer.

If level 190 is close to but slightly under level EG, as shown in FIG. 4, the excitation process from GG to EE will occur with relatively low powers on both the beams 152, 154 simultaneously. When the level EE is achieved, one electron from the dimer will be displaced from the dimer. This electron from the dimer will be displaced from the dimer. This electron is then trapped by one of the second types of dimers with which the material 102 is doped. This phenomenon is depicted in representational form diagramatically in FIGS. 5 and 6.

Figure 5:
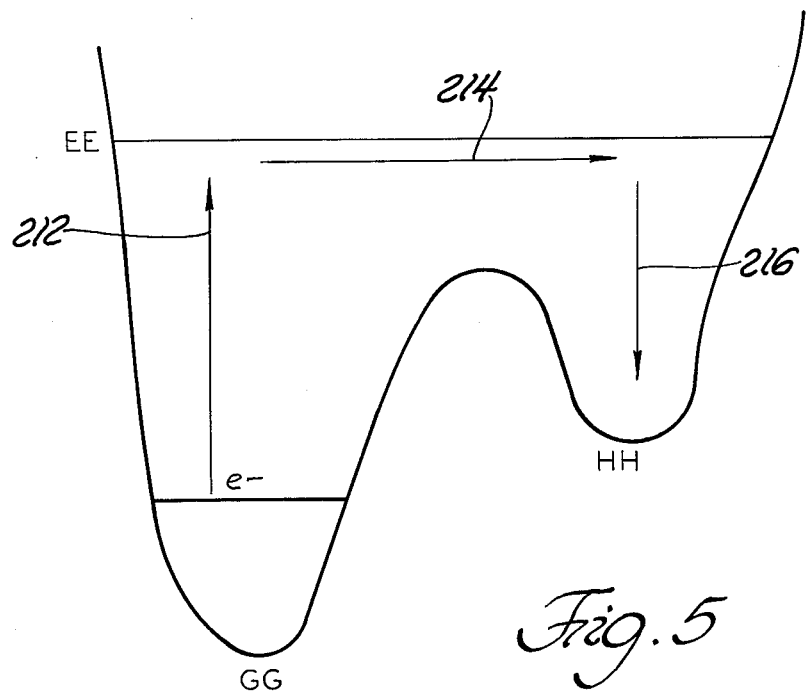
FIG. 5 is a diagram illustrating a portion of the operation of the apparatus shown in FIG. 2.

FIG. 5 is a representation of the dimer diagramatically represented in FIG. 4 prior to excitation by simultaneous convergence of the beams 152, 154 within the region of that dimer. Prior to such excitation, the dimer with the ground state GG is charged neutrally with an electron indicated representationally at E− within a region of the dimer indicated by the letters GG.

Figure 6:
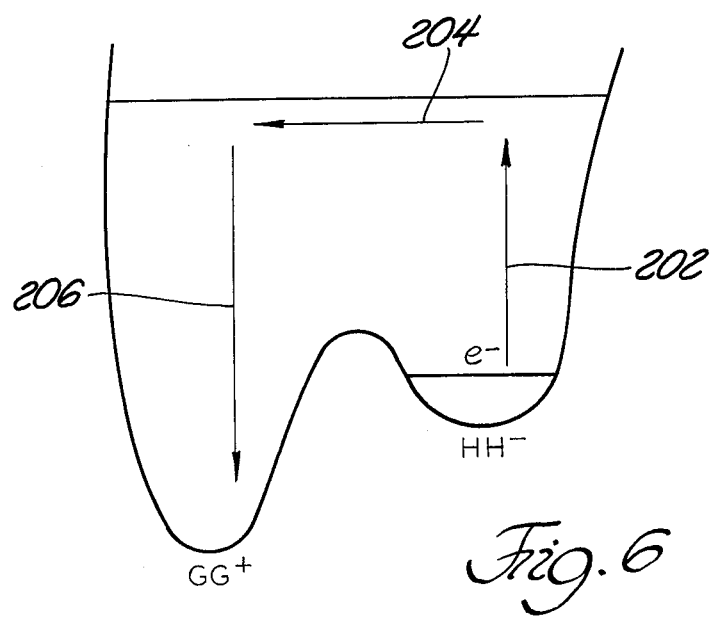
FIG. 6 is a diagram illustrating a portion of the operation of the apparatus shown in FIG. 2.

FIG. 6 represents both the dimers labled GG and HH respectively as they were in FIG. 5, however this represents the state of the two dimers GG, HH after the excitation of the beams 152, 154 previously described with respect to FIG. 4. After the occurence of this phenomenon, the dimer formerly represented by level GG now is in a positively charged state and is represented by GG+ and the other dimer of the pair HH is now negatively charged represented by the letters HH− and the electron is now trapped within the region of the second dimer HH.

In order for the moving of the electron from one dimer to another as indicated in the discussions immediately above with references to FIGS. 4 through 6, it is necessary that the beams 152, 154 have particular frequencies. The frequencies of the lasers along paths 152, 154 must be such that their combined energy levels are at least equal to the frequency necessary for excitation to level EE of the dimer represented in FIG. 2. They also must be such that the frequency of the laser beam along path 152 must be less than but close to the excitation level EG of one of the right or left hand members of the dimer represented in FIG. 4.

To be more precise, if the energy level EE is less than twice that of the energy level EG by a characteristic frequency represented by the letter delta, then the frequency characteristic mu which represents the difference in the frequency of the beam 152 from the excitation level EG must be less than delta and, more importantly, small in comparison to delta. By small it is meant an order of magnitude. If mu is big with respect to delta, there will be a cancellation of transition moments in the two photon excitation process which will render the achievement of the excitation level EE by the simultaneous convergence of the beams either weak or impossible. The correspondence of energy levels of a dimer to characteristic frequencies of electromagnetic excitation such as those in the visible or laser spectrum, are calculations well known in the laser art and spectroscopy generally.

When the phenomenon as previously described in FIGS. 4, 5 and 6 takes place, the excitation of a dimer causes an electron to leave one trapped portion of a region for another. The region in which this phenomenon takes place operated as a switch. The condition of the switch as to either on or off, thereby corresponding to a neutral or charged state of the dimer, can be detected by the coherent anti-Stokes Raman process, in a manner well known in the art. The frequencies of the beams used in the coherent anti-Stokes Raman process for detection of the excitation or state of the switch, is that described previously with respect to FIGS. 2 and 3.

When it is desired to change the excitation state of dimers within the region just discussed, convergence of beams 152 and 154 in an analogous manner with respect to the excitation states of the other dimer HH can be applied again, in an analogous fashion to the manner in which the dimer GG was excited. This causes the excitation of HH to bounce the electron back from the HH− sector to the GG+ sector as shown in FIG. 6 and by the arrows 202, 204, 206 indicating the reverse of the process of the transferred electron indicated in FIG. 5 by numerals 212, 214, 216. The detection of whether the reverse process is taking place can again be done by an analogous process as before with respect to the coherent anti-Stokes Raman scattering process.

However, a different set of frequencies is required for detection of the reverse state as to the former state because of the different characteristic frequencies of excitation as between the two dimers GG, HH. In the former case, in determining whether a dimer GG has been excited to GG+, one may use coherent anti-Stokes Raman scattering in a manner well known in the art, to look at either the dimer GG or the dimer HH. To observe whether or not the switch is in the other position, characteristic frequencies of the beams 152, 154 in the coherent anti-Stokes Raman scattering process is determined by the energy levels GG+, HH− as opposed to levels of GG, HH.

From the foregoing description, it is apparent that a device has been developed that will allow a large array of portions of the region 102 to be selectively excited or reversed in excitation state as well as being detected as to the particular excitation of each such portion within the region. This allows for a large plurality of space entities to be selectively excited or de-excited in a particular switching configuration. Moreover, the region need not be in a planar or surface array but can be portions within a region in a three-dimensional sense that will allow a relatively large number of switching locations to be selectively excited, determined and reversed. It may be convenient to describe these processes of excitations and reverse excitations as writing and erasing, with the use of coherent anti-Stokes Raman scattering process as reading. It is also clear that the physical apparatus just described may be a convenient way of constructing a small telephone exchange or constructing a large array of simulated relays for a weaving maching to construct a selected intricate weaving pattern.

Using the teachings of this invention, it is possible to provide a Babbage engine with a random access memory. Using the teachings of this invention, it is possible to program the operations of a Turing machine. Using the teachings of this invention, it is possible to provide a Turing machine with a random access memory with a number of selectively written or erased or readable locations without affecting writing or erasure in other locations in a three-dimensional array wherein the number of locations to be selectively written, erased or read is on the order of one location within a region having a volume of less than a billion cubic angstroms, where the distance between one such location and the other is a displacement of less than 10,000 angstroms and the total number of such memory locations can be packed accordingly within a region having dimensions as large as several cubic centimeters. The charge of dimers can be maintained without maintaining external electrical excitation, once an electron transference has been made by two photon spectroscopy. An electronic bistable three-dimensional array can be packed in a three-dimensional solid with as many random accessible memory locations as great as several billion per cubic millimeter. Thus, a random access memory has been provided where a medium doped with two different dimers can be selectively written, read and erased at more than several trillion locations selectively in a medium having a volume of several cubic centimeters within the medium.

This represents an advance in the art where previous efforts were confined to planar or surface configurations. Surface memory density is at best several thousand memory locations per square milimeter. This contrasts with the present device with several orders of magnitude great number of memory locations per cubic milimeter.

I claim:

1. In an electronic bistable three-dimensional array, the improvements comprising:
   a solid material;
   said solid material doped with at least two different dimers;
   one of said dimers having characteristic frequencies for achieving different energy states;
   the other of said dimers having another set of characteristic frequencies of excitation for different excitation states;
   the frequencies for said excitations being in the range of frequencies characteristic of electromagnetic waves in the visible and ultraviolet spectrum;
   a first laser excitation and directing apparatus;
   a second laser generating and directing apparatus;
   said first laser apparatus selectively operable to emit a laser having a frequency within the end frequencies capable of exciting a first level within a level of excitation in one of said dimers;
   said second laser apparatus selectively operable to emit a laser having a frequency such that if said second laser intersects said first laser within the region of said one of said dimers, said dimer is excited to a doubly excited level sufficient to transfer an electron therefrom;
   the path of said first laser intersecting the path of said second laser in such a manner that subsequent lasers along the same paths from both said first and second laser apparatus are capable of generating a third beam by coherent anti-Stokes Raman scattering;
   said other of said dimers operable to trap said transferred electron responsive to said generation of said selected frequencies of said first and second lasers;
   said first and second laser apparata selectively operable to emit lasers of selected frequencies such that the simultaneous intersection of said lasers by said second selected frequency selection is operable to raise the excitation within the other of said dimers sufficient to transfer the previously transferred electron back to said one of said dimers;
   whereby a region within said solid can be selectively energized to a first level distinct from a de-energized state selectively determined by coherent anti-Stokes Raman scattering as to whether said first excitation level has been achieved.

2. In the apparatus of claim 1, electronic means selectively directing the paths of said laser devices.

* * * * *